US011074136B2

(12) United States Patent
Behera et al.

(10) Patent No.: US 11,074,136 B2
(45) Date of Patent: Jul. 27, 2021

(54) SYSTEM AND METHOD FOR A HYBRID WORKFLOW BACKUP OPERATION OF DATA IN A CLOUD-BASED SERVICE WITH THIRD-PARTY APPLICATIONS

(71) Applicant: EMC IP Holding Company LLC, Hopkinton, MA (US)

(72) Inventors: Amarendra Behera, Bangalore (IN); Sonali Sengupta, Bangalore (IN); Shelesh Chopra, Bangalore (IN); Sunil Yadav, Bangalore (IN); Sapna Chauhan, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 33 days.

(21) Appl. No.: 16/668,919

(22) Filed: Oct. 30, 2019

(65) Prior Publication Data

US 2021/0133039 A1    May 6, 2021

(51) Int. Cl.
*G06F 12/00* (2006.01)
*G06F 11/14* (2006.01)

(52) U.S. Cl.
CPC ...... *G06F 11/1461* (2013.01); *G06F 11/1451* (2013.01); *G06F 11/1464* (2013.01); *G06F 11/1466* (2013.01); *G06F 11/1469* (2013.01)

(58) Field of Classification Search
CPC ............. G06F 11/1461; G06F 11/1469; G06F 11/1466; G06F 11/1451; G06F 11/1464
See application file for complete search history.

(56) References Cited

U.S. PATENT DOCUMENTS

| | | | | |
|---|---|---|---|---|
| 10,616,127 | B1* | 4/2020 | Suit | G06F 9/5088 |
| 10,896,097 | B1* | 1/2021 | Purcell | G06F 16/2255 |
| 2014/0068212 | A1* | 3/2014 | Lin | G06F 11/1461 |
| | | | | 711/162 |
| 2015/0096011 | A1* | 4/2015 | Watt | H04L 63/0272 |
| | | | | 726/15 |
| 2016/0342403 | A1* | 11/2016 | Zamir | G06F 8/61 |
| 2020/0264919 | A1* | 8/2020 | Vukovic | G06F 9/5044 |

\* cited by examiner

*Primary Examiner* — Arvind Talukdar
(74) *Attorney, Agent, or Firm* — Chamberlain, Hrdlicka, White, Williams & Aughtry

(57) ABSTRACT

A method for performing a backup operation includes obtaining, by a backup agent, a backup request, and in response to the backup request: obtaining a complete application listing, wherein the complete application listing specifies a plurality of applications associated with the backup request, comparing the complete application listing to a cloud-based application listing, wherein the cloud-based application listing specifies a portion of the plurality of applications, making a first determination that the complete application listing specifies more than the portion of the plurality of applications, and in response to the first determination, initiating a hybrid workflow, wherein the hybrid workflow specifies backing up each of the plurality of applications.

20 Claims, 6 Drawing Sheets

SYSTEM AND METHOD FOR A HYBRID WORKFLOW BACKUP OPERATION OF DATA IN A CLOUD-BASED SERVICE WITH THIRD-PARTY APPLICATIONS

BACKGROUND

Computing devices may include any number of internal components such as processors, memory, and persistent storage. Each of the internal components of a computing device may be used to generate data and to execute functions. The process of generating, storing, and sending data may utilize computing resources of the computing devices such as processing and storage. The utilization of the aforementioned computing resources to generate data and to send data to other computing devices may impact the overall performance of the computing resources.

SUMMARY

In general, in one aspect, the invention relates to a method for performing backup operations. The method includes obtaining, by a backup agent, a backup request, and in response to the backup request: obtaining a complete application listing, wherein the complete application listing specifies a plurality of applications associated with the backup request, comparing the complete application listing to a cloud-based application listing, wherein the cloud-based application listing specifies a portion of the plurality of applications, making a first determination that the complete application listing specifies more than the portion of the plurality of applications, and in response to the first determination, initiating a hybrid workflow, wherein the hybrid workflow specifies backing up each of the plurality of applications.

In general, in one aspect, the invention relates to a system that includes a processor and memory that includes instructions which, when executed by the processor, perform a method. The method includes obtaining, by a backup agent, a backup request, and in response to the backup request: obtaining a complete application listing, wherein the complete application listing specifies a plurality of applications associated with the backup request, comparing the complete application listing to a cloud-based application listing, wherein the cloud-based application listing specifies a portion of the plurality of applications, making a first determination that the complete application listing specifies more than the portion of the plurality of applications, and in response to the first determination, initiating a hybrid workflow, wherein the hybrid workflow specifies backing up each of the plurality of applications.

In general, in one aspect, the invention relates to a non-transitory computer readable medium that includes computer readable program code, which when executed by a computer processor enables the computer processor to perform method for performing backup operations. The method includes obtaining, by a backup agent, a backup request, and in response to the backup request: obtaining a complete application listing, wherein the complete application listing specifies a plurality of applications associated with the backup request, comparing the complete application listing to a cloud-based application listing, wherein the cloud-based application listing specifies a portion of the plurality of applications, making a first determination that the complete application listing specifies more than the portion of the plurality of applications, and in response to the first determination, initiating a hybrid workflow, wherein the hybrid workflow specifies backing up each of the plurality of applications.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, one or more embodiments of the invention relates to performing a backup operation on data associated with a cloud-based service and incorporating data associated with third-party applications in the backup operation. Embodiments of the invention relate to using a cloud-based application writer associated with the cloud-based service that tracks third-party applications (i.e., applications that are not part of the cloud-based service) that utilize data associated with the cloud-based service. Embodiments of the invention may include allowing an administrator or a user of the cloud-based service to determine whether to back up the third-party applications with the cloud-based applications. Embodiments of the invention may further include backing up the cloud-based applications and the third-party applications concurrently and storing backups in a backup storage system.

Figure 1:
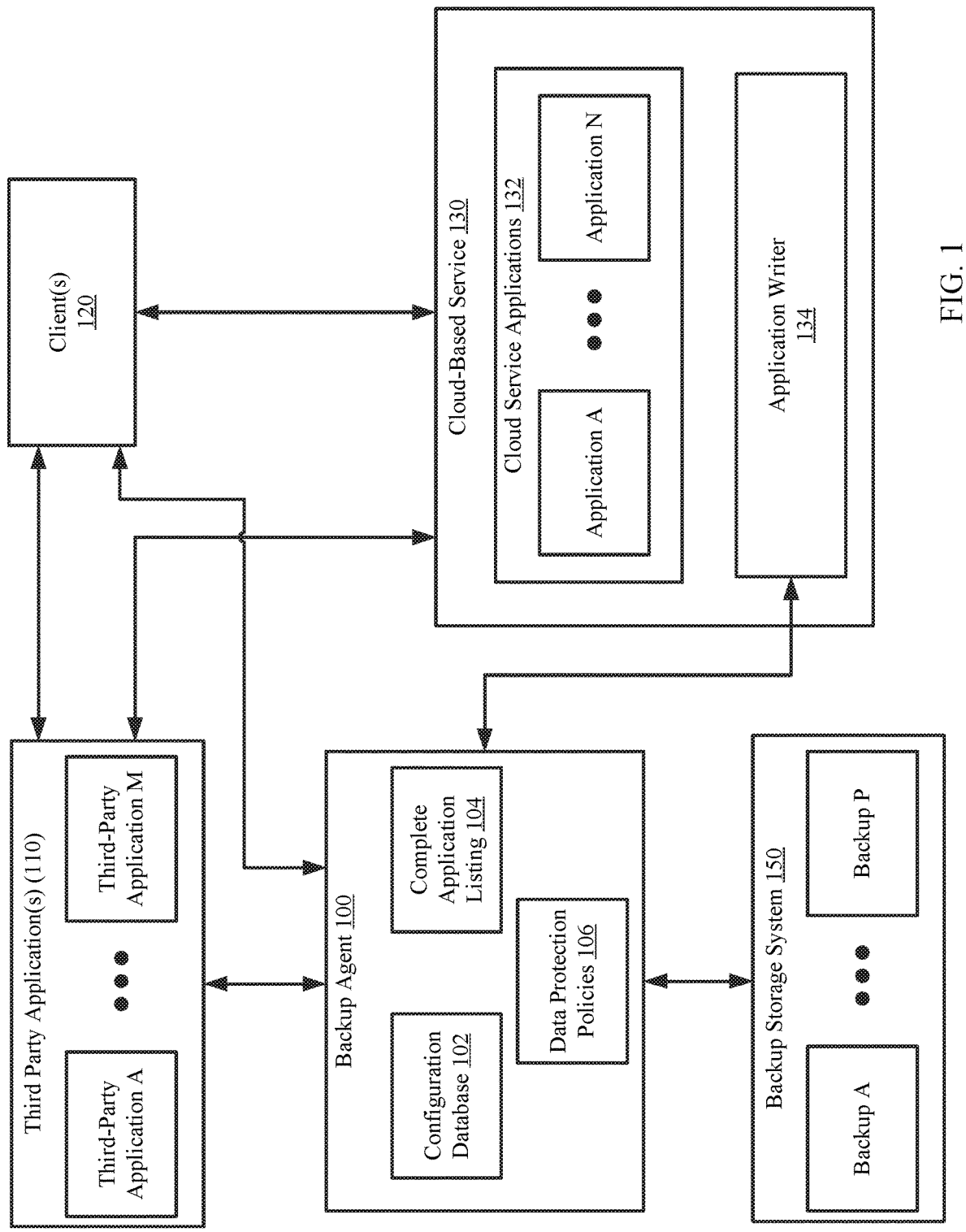
FIG. 1 shows a diagram of a system in accordance with one or more embodiments of the invention.

FIG. 1 shows a diagram of a system in accordance with one or more embodiments of the invention. The system may include one or more clients (120), a backup agent (100), a backup storage system (150), a cloud-based service (130), and third-party applications (110). The system may include additional, fewer, and/or different components without departing from the invention. Each component may be operably connected to any of the other components via any combination of wired and/or wireless connections. Each of the aforementioned components is discussed below.

In one or more embodiments of the invention, the backup agent (100) performs backups of applications and stores the backups in the backup storage system (150). The backup agent (100) may implement data protection policies (106) that specify methods for enabling the backup agent (100) to back up and/or restore application data. The backup agent (100) may store a configuration database (102) that specifies configuration settings for the cloud service applications (132). The configuration database (102) may be used to identify the cloud service applications that are associated with the cloud-based service (132) during a backup operation.

In one or more embodiments of the invention, the configuration database (102) is a data structure that stores configuration information associated with the cloud-based applications (132). The configuration database (102) may include entries that each specify a cloud-based application (132) and any configuration information associated with the cloud-based application. In one or more embodiments of the invention, the configuration database (102) does not specify any of the third-party applications (110).

In one or more embodiments of the invention, the complete application listing (104) is a data structure that specifies any applications (110, 132) that are associated with the data written to or otherwise accessed from the cloud-based service (130). The complete application listing (104) may include a list of application identifiers that each uniquely identify a cloud-based application (132) and/or a third party application (110).

In one or more embodiments of the invention, the data protection policies (106) are data structures that each include one or more schedules for backing up the cloud-based applications (132) or the third-party applications and/or the application data of the respective applications (132, 110). The data protection policies (106) may further specify a type of backup (also referred to as a backup type) to be performed on the applications (132, 110). The backup types may vary, for example, between an incremental backup and a full backup.

In one or more embodiments of the invention, a full backup of an application is a backup associated with a specified point in time that includes all data associated with the application. The full backup may not be dependent on other backups in order for the application to be restored to the specified point in time.

In one or more embodiments of the invention, an incremental backup may be a backup associated with a specified point in time that includes a portion of a previous backup that has been since added, removed, or otherwise modified since the previous backup. An incremental backup may be dependent on at least a full backup and any intermediate incremental backups for the purpose of recovery.

In one or more embodiments of the invention, the backup types may further vary between virtual shadow copies of the applications and/or a virtual device interface (VDI) type backup. The type of backup to be implemented on an application may vary based on, for example, whether the application is a cloud-based application (132) or a third-party type application (110).

In one or more embodiments of the invention, the data protection policies (106) further includes recovery policies that specify policies for restoring one or more applications (132, 110). For example, if a full backup of an application was generated at a point T1, and an incremental backup based on the full backup was generated at a point in time T2, a recovery policy may specify that the incremental backup is dependent on the full backup. In this manner, the backup agent (100), or other entity performing the recovery, may be utilize the dependency when recovering the application.

In one or more embodiments of the invention, the recovery policies may include a hybrid workflow identifier. In one or more embodiments of the invention, a hybrid workflow identifier is a string of numbers, letters, characters, and/or any combination thereof that uniquely identifies a hybrid workflow. In one or more embodiments of the invention, a hybrid workflow is a method for performing a backup operation of both cloud-based applications (132) and third-party applications (110) at a specified point in time that is shared between the applications (132, 110). The hybrid workflow may specify the type of backup (e.g., incremental, full, etc.) that is performed on each application (132, 110) and the point in time in which the backup is performed.

In one or more embodiments of the invention, the backup agent (100) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the backup agent (100) described throughout this application and/or all, or a portion thereof, of the method illustrated in FIGS. 2A-2B.

Figure 2A:
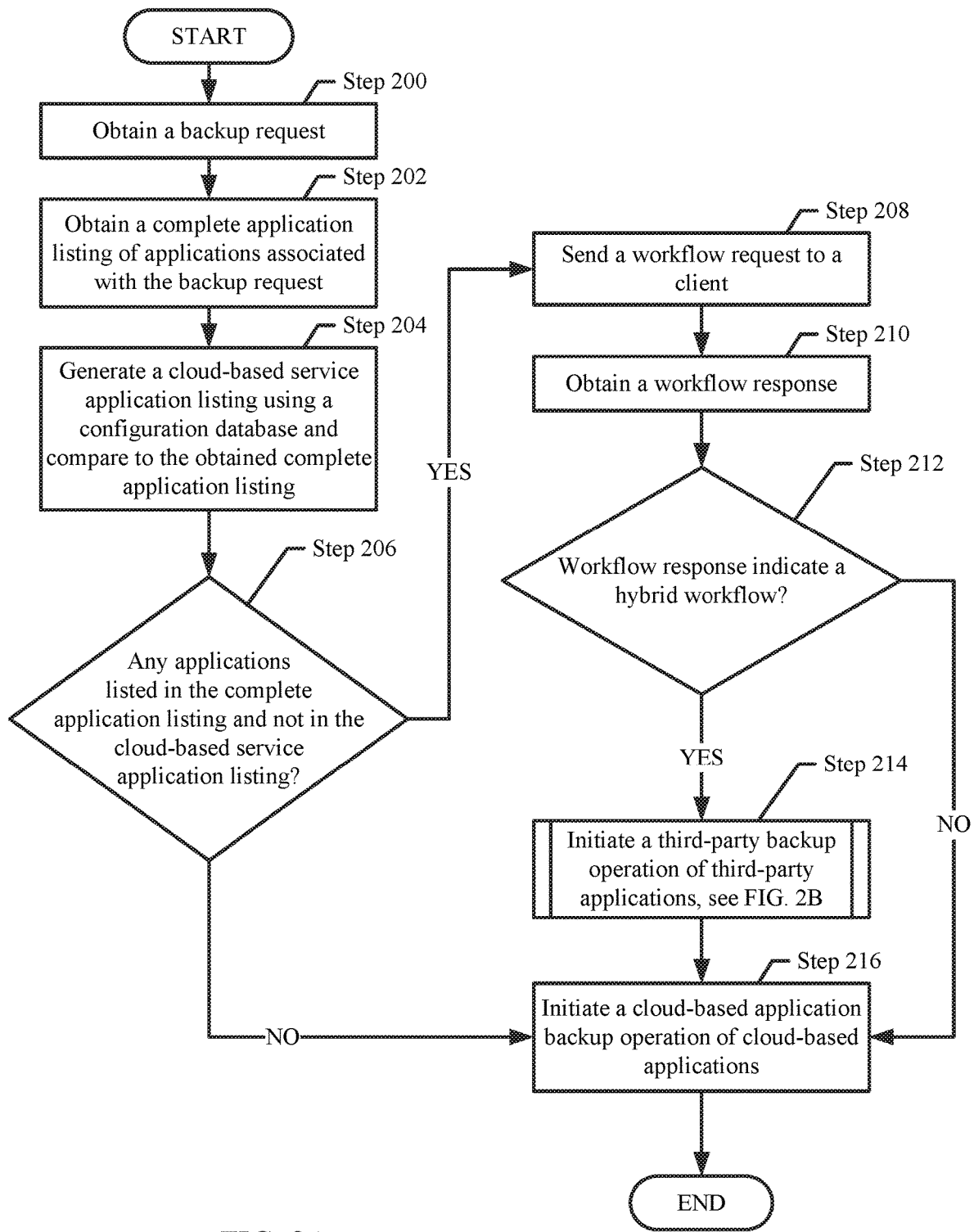
FIG. 2A shows a flowchart for servicing backup requests in accordance with one or more embodiments of the invention.
Figure 2B:
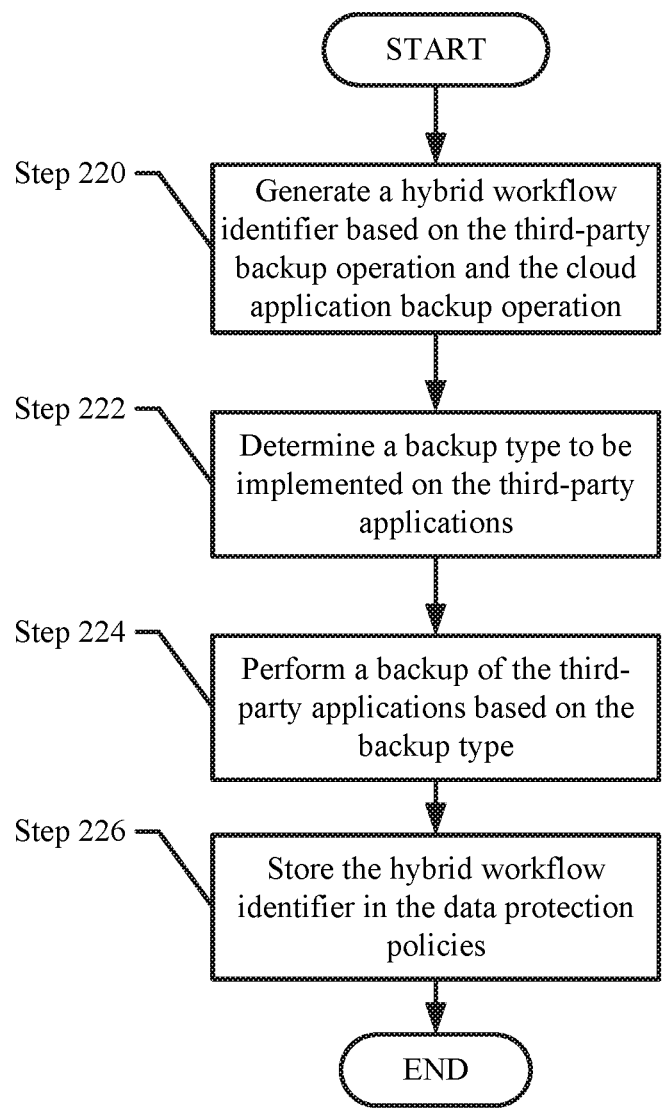
FIG. 2B shows a flowchart for initiating a third-party backup operation in accordance with one or more embodiments of the invention.

In one or more of embodiments of the invention, the backup agent (100) is implemented as computer instructions, e.g., computer code, stored on a persistent storage that when executed by a processor of the computing device causes the computing device to provide the functionality of the backup agent (100) described throughout this application and/or all, or a portion thereof, of the method illustrated in FIGS. 2A-2B.

In one or more embodiments of the invention, the client(s) (120), operated by users, utilize services provided by the cloud-based service (130). Specifically, the client(s) (120) may utilize the applications (132) of the cloud-based service (130) and/or the third-party applications (110) to obtain, modify, and/or store data.

Figure 4:
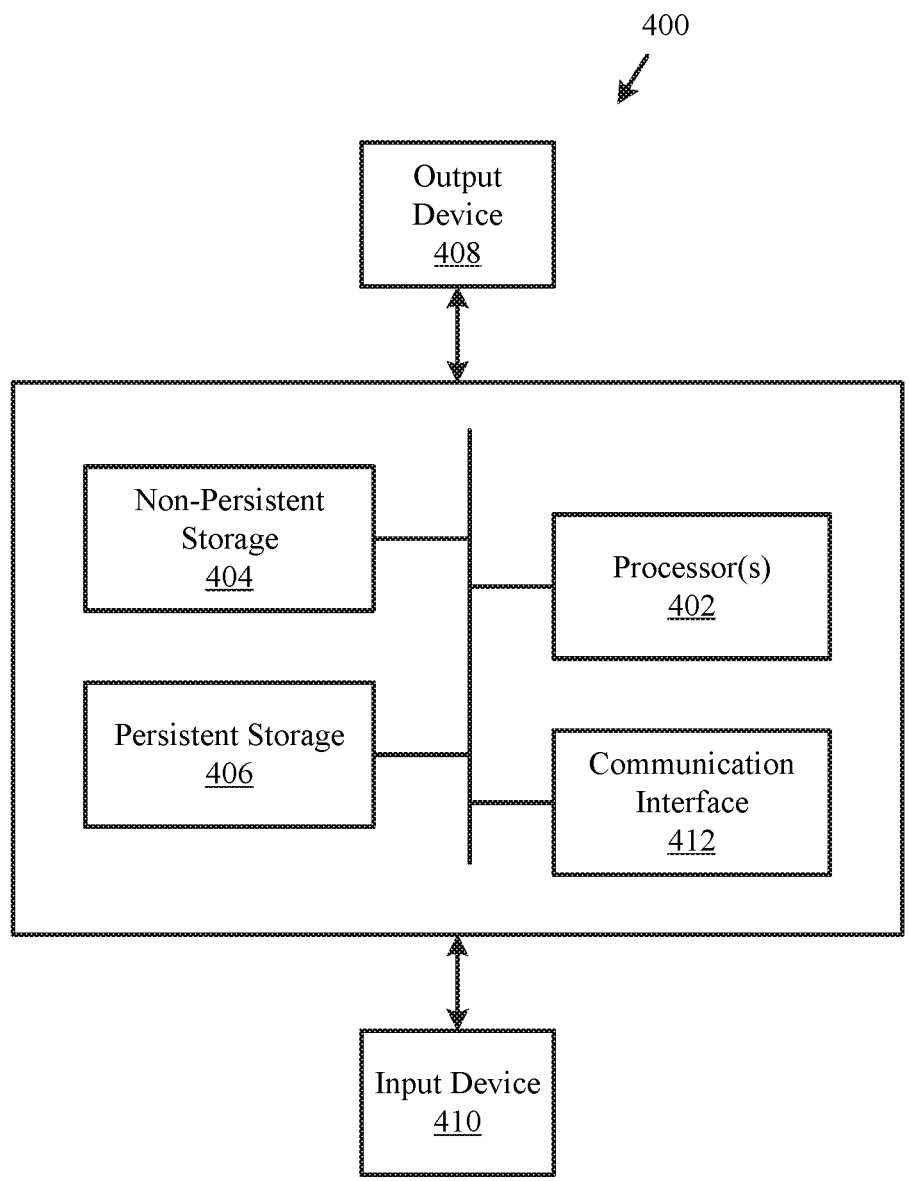
FIG. 4 shows a diagram of a computing device in accordance with one or more embodiments of the invention.

In one or more embodiments of the invention, a client (120) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions, stored on the persistent storage, that when executed by the processor(s) of the computing device cause the computing device to perform the functionality of the client (120) described throughout this application.

In one or more embodiments of the invention, the client(s) (120) are implemented as a logical device. The logical device may utilize the computing resources of any number of computing devices and thereby provide the functionality of the client(s) (120) described throughout this application.

In one or more embodiments of the invention, the cloud-based service (130) host applications (132) (also referred to as cloud-based applications). The applications (132) may be logical entities executed using computing resources (not shown) of the cloud-based service (130). Each of the applications (132) may be performing similar or different processes. In one or more embodiments of the invention, the applications (132) provide services to users, e.g., clients (120). The applications may be, for example, instances of databases, email servers, and/or other applications without departing from the invention.

In one or more of embodiments of the invention, the applications (132) are implemented as computer instructions, e.g., computer code, stored on a persistent storage that when executed by a processor(s) of a computing device (see, e.g., FIG. 4) cause the computing device to provide the functionality of the applications (132) described throughout this application.

In one or more embodiments of the invention, the cloud-based service utilizes an application writer (134). The application writer (134) writes data generated, obtained and/or otherwise associated with the cloud-based applications (132) and/or the third-party applications (110) to storage operated by the cloud-based service (130). Further, the application writer (134) may track the applications that are associated with the data written by the application writer (134).

For example, a cloud-based application (132) may host a database, and the database may be accessed and/or modified by a third-party application (110). The application writer (134) may manage the writing of the data modified by the third-party application and track the third-party application as an application that accessed the data. In this manner, the cloud-based service (130), via the application writer (134), is aware of the applications (e.g., 132, 110) that are associated with data utilized by the clients (120) through the cloud-based service (130).

In one or more embodiments of the invention, the application writer (134) is a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the application writer (134) described throughout this application.

In one or more embodiments of the invention, the application writer (134) is implemented as computer instructions, e.g., computer code, stored on a persistent storage of a computing device that when executed by a processor of the computing device causes the computing device to provide the functionality of the application writer (134) described throughout this application.

In one or more embodiments of the invention, the cloud-based service (130) is implemented as a logical device. The logical device may utilize the computing resources of any number of computing devices and thereby provide the functionality of the cloud-based service (130) described throughout this application.

In one or more embodiments of the invention, the third-party applications (110) are applications that operate externally from the applications (132) of the cloud-based service (130). The applications (110) may be logical entities executed using computing resources (not shown) of one or more computing devices (see, e.g., FIG. 4). Each of the applications (110) may be performing similar or different processes. In one or more embodiments of the invention, the applications (110) provide services to users, e.g., clients (120). The applications may be, for example, instances of databases, email servers, and/or other applications without departing from the invention.

In one or more of embodiments of the invention, the applications (110) are implemented as computer instructions, e.g., computer code, stored on a persistent storage that when executed by a processor(s) of a computing device (see, e.g., FIG. 4) cause the computing device to provide the functionality of the applications (132) described throughout this application.

In one or more embodiments of the invention, the backup storage system (150) store backups of the cloud-based applications (132) and/or the third-party applications (110). In one or more embodiments of the invention, a backup is a copy of data associated with an application (e.g., 132, 110) at a specified point in time.

In one or more embodiments of the invention, the backup storage system (150) is implemented as a computing device (see e.g., FIG. 4). The computing device may be, for example, a mobile phone, a tablet computer, a laptop computer, a desktop computer, a server, a distributed computing system, or a cloud resource. The computing device may include one or more processors, memory (e.g., random access memory), and persistent storage (e.g., disk drives, solid state drives, etc.). The computing device may include instructions stored on the persistent storage, that when executed by the processor(s) of the computing device cause the computing device to perform the functionality of the backup storage system (150) described throughout this application.

In one or more embodiments of the invention, the backup storage system (150) is implemented as a logical device. The logical device may utilize the computing resources of any number of computing devices and thereby provide the functionality of the backup storage system (150) described throughout this application.

The invention is not limited to the architecture shown in FIG. 1.

FIGS. 2A-2B show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 2A-2B may be performed in parallel with any other steps shown in FIGS. 2A-2B without departing from the scope of the invention.

FIG. 2A shows a flowchart for servicing backup requests in accordance with one or more embodiments of the invention. The method shown in FIG. 2A may be performed by, for example, a backup agent (100, FIG. 1). Other components of the system illustrated in FIG. 1 may perform the method of FIG. 2A without departing from the invention.

In step 200, a backup request is obtained. The backup request may specify one or more applications to be backed up. The backup request may be obtained from, for example, a client.

In one or more embodiments of the invention, the backup request is a result of implementing a data protection policy. The backup agent may identify a data protection policy that specifies a point in time (or points in time) in which to back up one or more applications. The applications may be cloud-based service applications and/or third-party applications without departing from the invention.

In step 202, a complete application listing is obtained associated with the backup request. In one or more embodiments of the invention, the complete application listing may be generated in response to the backup request. The complete application listing may be generated by identifying a list of applications that are specified in the application writer of the cloud-based service. The backup agent may send a request to the application writer to obtain a complete listing of applications (either cloud-based applications, third-party applications, or a combination of both) utilizing the data associated with the cloud-based service.

In step 204, a cloud-based service application listing is generated using a configuration database. The cloud-based service application listing may be generated by listing the applications specified in the configuration database. Because the configuration database only specifies the cloud-based applications, the cloud-based application listing may be a partial list of the complete application listing if the complete application listing includes third-party applications.

Subsequently, the cloud-based application listing is compared to the complete application listing to identify applications that are specified in the complete application listing but not specified in the cloud-based application listing.

In step 206, a determination is made about whether any applications were identified that are specified in the complete application listing but not specified in the cloud-based application listing. If one or more applications were specified in the complete application listing but not specified in the cloud-based application listing, the method proceeds to step 208, otherwise, the method proceeds to step 216.

In step 208, following the determination of step 206 that applications were identified that are specified in the complete application listing but not specified in the cloud-based application listing (e.g., third-party applications), a workflow request is sent to a client associated with the applications. The workflow request may specify that the client select between backing up only the cloud-based applications specified in the cloud-based application listing or performing a hybrid workflow in which a backup is performed for both the cloud-based applications and the third-party applications. Further, the workflow request may specify selecting a type of backup to be performed for each application.

In step 210, a workflow response is obtained. The workflow response may specify whether the hybrid workflow is to be implemented or whether only the cloud-based applications are to be backed up. The workflow response may also specify the type of backups to be generated for each application.

In step 212, a determination is made about whether the workflow response indicates a hybrid workflow. If the workflow response indicates a hybrid workflow, the method proceeds to step 214, otherwise, the method proceeds to step 216.

In step 214, a third-party backup operation of the third-party applications is initiated. In one or more embodiments of the invention, the third-party applications are backed up in accordance with the type of backup specified in the workflow response and/or a data protection policy.

The third-party backup operation may be performed via the method illustrated in FIG. 2B. The third-party backup operation may be performed via other methods without departing from the invention.

In step 216, a cloud-based application backup operation of the cloud-based applications is initiated. In one or more embodiments of the invention, the cloud-based application backup operation is performed by obtaining the application data, configuration information, and/or any other data associated with each cloud-based application and generating a copy of the obtained data and storing the data as a backup in the backup storage system.

In one or more embodiments of the invention, the cloud-based application backup operation is performed based on the types of data specified in the workflow response and/or the data protection policies. For example, if a data protection policy specifies generating an incremental backup of a cloud-based application, the cloud-based application may be backed up by identifying a previous backup associated with the cloud-based application and identifying the data that has been added, deleted, and/or otherwise modified since the previous backup. The identified data may be copied and stored in the incremental backup.

In one or more embodiments of the invention, the third-party backup operation of step 214 is performed in parallel to the cloud-based application backup operation of step 216.

FIG. 2B shows a flowchart for initiating a backup of third-party applications in accordance with one or more embodiments of the invention. The method shown in FIG. 2B may be performed by, for example, a backup agent (110, FIG. 1). Other components of the system illustrated in FIG. 1 may perform the method of FIG. 2B without departing from the invention.

In step 220, a hybrid workflow identifier is generated based on the third-party backup operation and the cloud-based backup operation.

In step 222, a backup type to be implemented on the third-party applications is determined. In one or more embodiments of the invention, the backup type to be generated may be based on the workflow response. For example, if the workflow response specifies performing full backups on the third-party applications, the backup type of full backup may be implemented for each third-party application.

In one or more embodiments of the invention, if the workflow response does not specify the backup type, the backup type may be determined based on a backup policy implemented by the backup agent. For example, a backup policy may specify that all third-party applications are to be backed up using full backups.

In step 224, a backup of the third-party applications is performed based on the backup policy. In one or more embodiments of the invention, the third-party application backup operation is performed by obtaining the application data, configuration information, and/or any other data associated with each third-party application and generating a copy of the obtained data and storing the data as a backup in the backup storage system.

In one or more embodiments of the invention, the third-party application backup operation is performed based on the types of data determined in step 222. For example, if a data protection policy specifies generating an incremental backup of a cloud-based application, the cloud-based application may be backed up by identifying a previous backup associated with the cloud-based application and identifying the data that has been added, deleted, and/or otherwise modified since the previous backup. The identified data may be copied and stored in the incremental backup.

In step 226, the hybrid workflow identifier is stored in the data protection policies. The hybrid workflow identifier may be stored in a data structure that specifies the third-party applications, the cloud based applications backed up in the method of FIG. 2A, a timestamp associated with the backup operations, and a dependency (if any) between incremental backups generated in the hybrid workflow to other backups in the backup storage system. In this manner, the entity recovering the data in the backups may utilize the appropriate backups to recover the application data to the specified point in time.

EXAMPLE

Figure 3A:
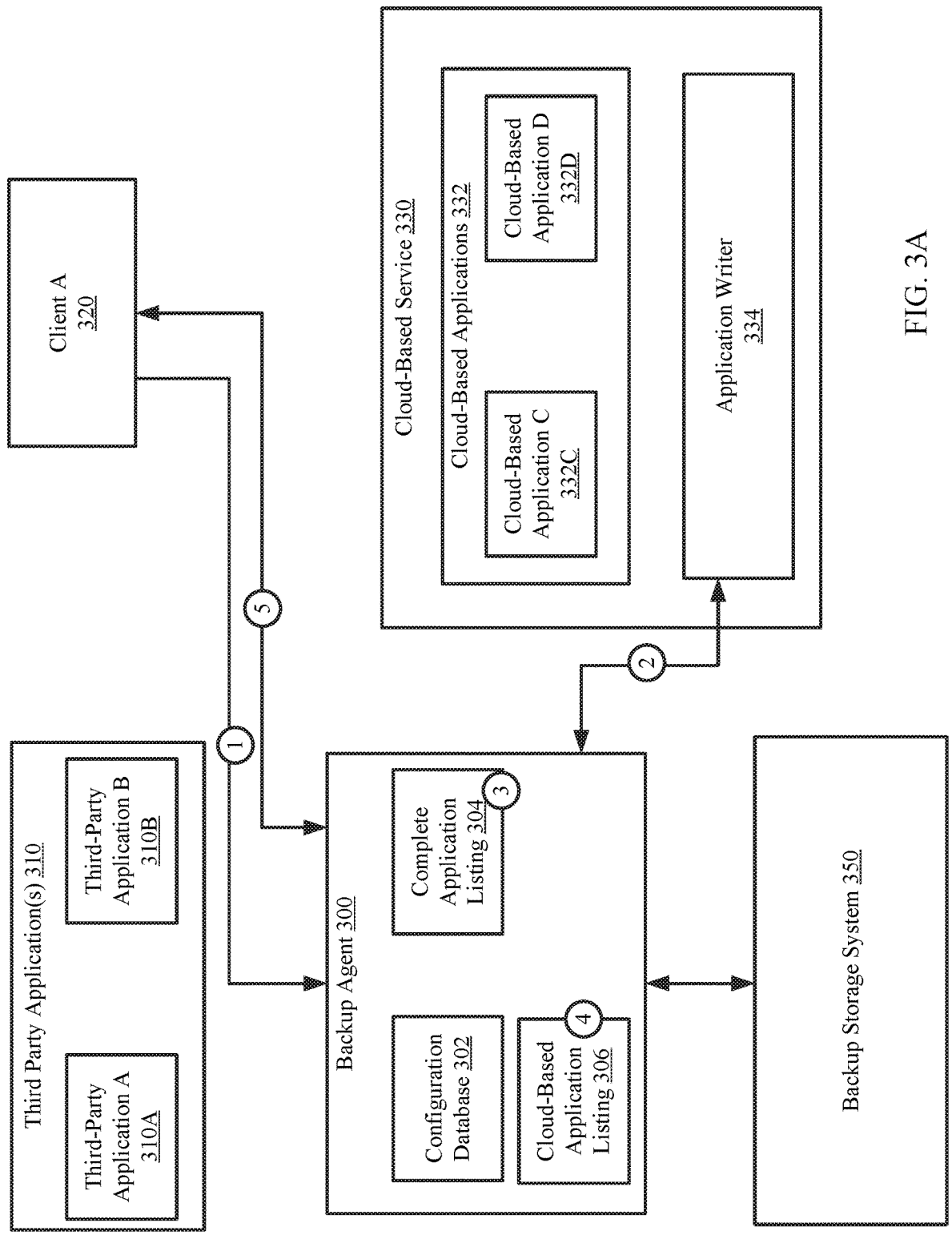
FIGS. 3A-3B shows an example in accordance with one or more embodiments of the invention.

The following section describes an example. The example, illustrated in FIG. 3, is not intended to limit the invention. Turning to the example, consider a scenario in which a system is performing a backup operation on applications. The system includes a client (320), a backup agent (300), a cloud-based service (330), third party applications (310), and a backup storage system (350).

The client (320) initiates the backup operation by sending a backup request to the backup agent (300) specifying backing up applications associated with data stored in the cloud-based service (330) [1]. In response to the backup request, the backup agent (300), in response to the backup request, communicates with the application writer (334) to obtain application identifiers that specify applications that have accessed the data stored in the cloud-based service (330) [2]. The identified applications are third-party applications A and B (310A, 310B) and cloud-based applications C and D (332C, 332D). Based on these identified applications, the backup agent (300) generates a complete application listing (304) that specifies all four applications (310A, 310B, 332C, 332D) [3].

After generating the complete application listing, the backup agent (300) uses a configuration database (302), which specifies the cloud-based applications (332C, 332D) and any configuration information associated with the cloud-based applications (332C, 332D) to obtain a cloud-based application listing (306) [4]. The cloud-based application listing (306) does not specify the third-party applications (310A, 310B). As such, the backup agent (300) compares the cloud-based application listing (306) to the complete application listing (304) to identify whether any applications are specified in addition to the cloud-based applications.

The backup agent identifies that there are additional applications (i.e., the third-party applications (310A, 310B)) and, subsequently, sends a workflow request to the client (320) that requests specifying whether the third-party applications are to be backed up (i.e., as part of a hybrid workflow) and the backup types to be generated for each application (310A, 310B, 332C, 332D). The client (320) replies with the workflow response [5]. The workflow response specifies performing a full backup of the third-party applications and a full backup of the cloud-based applications (132).

Figure 3B:
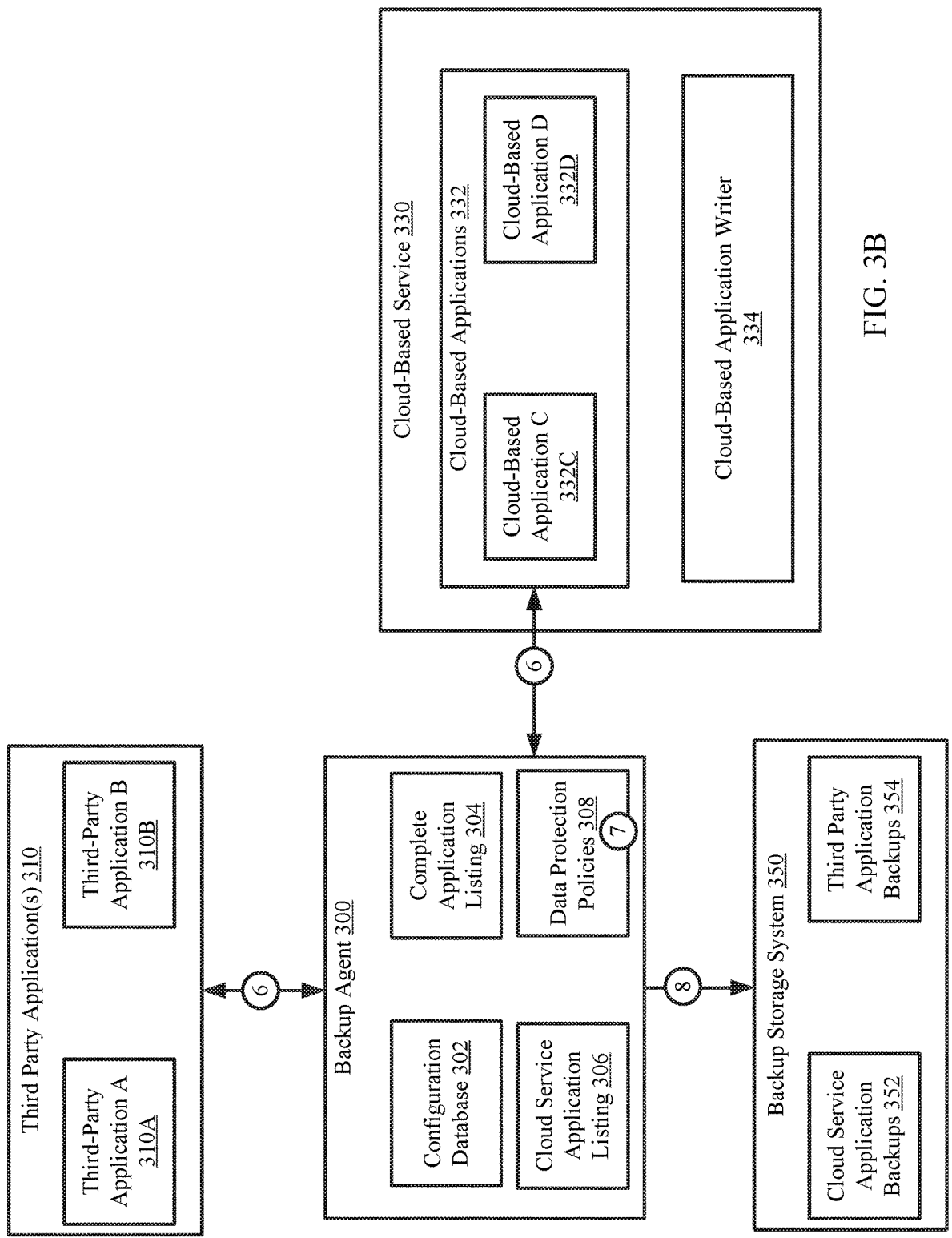

FIG. 3B shows the example system at a later point in time. At the later point in time, the backup agent (300) initiates a backup operation on the applications (310A, 310B, 332C, 332D) in accordance with the workflow response [6]. The backup operation is a hybrid workflow that includes generating a full backup of each third-party application (310A, 310B) and a full backup of each cloud-based backup (332C, 332D). The backup agent (300) generates a copy of the application data of each application (310A, 310B, 310C, 310D) and a copy of configuration information (e.g., using the configuration database (302)) associated with each application (310A, 310B, 310C, 310D) and generates backups in which to store each application data and configuration information.

After the hybrid workflow is performed, a hybrid workflow identifier is stored in data protection policies (308) that specify the hybrid workflow performed above [7]. The hybrid workflow identifier may be stored in an entry that further specifies a timestamp associated with the hybrid workflow, the applications that were backed up (310A, 310B, 310C, 310D), and the backup types associated with each backup. The entry may be used for recovery purposes when recovering the application data.

Further to storing the aforementioned entry, the backup agent (300) stores the backups of the cloud-based applications (352) and the backups for the third-party applications (354) in the backup storage system (350) [8].

End of Example

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

One or more embodiments of the invention may be implemented using instructions executed by one or more processors of the data management device. Further, such instructions may correspond to computer readable instructions that are stored on one or more non-transitory computer readable mediums.

One or more embodiments of the invention may improve the operation of one or more computing devices. More specifically, embodiments of the invention improve the efficiency of performing a backup operation of data in a cloud service by updating a backup operation to include backing up applications that are external to the cloud-based service. In this manner, a user of the cloud-based service has the option to back up any data that is associated with the cloud-based service, regardless of whether the data is stored in the cloud-based service or in an external third-party application.

Thus, embodiments of the invention may address the problem of inefficient use of computing resources. This problem arises due to the technological nature of the environment in which backup operations are performed.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A method for performing backup operations, the method comprising:
    obtaining, by a backup agent, a backup request; and
    in response to the backup request:
        obtaining a complete application listing, wherein the complete application listing specifies a plurality of applications specified in the backup request, wherein each of the plurality of applications is accessed by a cloud-based service;
        comparing the complete application listing to a cloud-based application listing, wherein the cloud-based application listing specifies a portion of the plurality of applications executing in the cloud-based service;
        making a first determination that the complete application listing specifies a second portion of the plurality of applications and that the cloud-based application listing does not specify the second portion of the plurality of applications; and
        in response to the first determination, initiating a hybrid workflow, wherein the hybrid workflow specifies backing up each of the plurality of applications.

2. The method of claim 1, further comprising:
    obtaining, by the backup agent, a second backup request; and
    in response to the second backup request:
        obtaining a second complete application listing, wherein the second complete application listing specifies a second plurality of applications associated with the second backup request;
        comparing the complete application listing to the cloud-based application listing, wherein the cloud-based application listing specifies the second plurality of applications;
        making a second determination that the complete application listing does not specify more than the second plurality of applications; and
        in response to the second determination, initiating a backup operation of the second plurality of applications.

3. The method of claim 1, further comprising:
    obtaining, by the backup agent, a second backup request; and
    in response to the second backup request:
        obtaining a second complete application listing, wherein the second complete application listing specifies a second plurality of applications associated with the backup request;
        comparing the second complete application listing to the cloud-based application listing;
        making a second determination that the second complete application listing specifies more than the portion of the plurality of applications; and
        in response to the first determination:
            sending a workflow request to a client;
            obtaining a workflow response, wherein the workflow response specifies performing a backup operation on the portion of applications; and
            in response to the workflow response, initiating the backup operation on the portion of the plurality of applications.

4. The method of claim 3, wherein the workflow response further specifies a backup type to be generated for the portion of applications.

5. The method of claim 1, wherein the plurality of applications comprises a portion of cloud-based applications and a portion of third-party applications.

6. The method of claim 1, wherein the complete listing is obtained from a cloud-based service, and wherein the cloud-based listing is obtained using a configuration databased stored in the backup agent.

7. The method of claim 1, wherein the hybrid workflow comprises:
    generating a hybrid workflow identifier;
    determining a backup type to be implemented on each of the plurality of applications;
    generating a backup of each of the plurality of applications; and
    storing the backup of each of the plurality of applications in a backup storage.

8. A system, comprising:
    a processor; and
    memory comprising instructions which, when executed by the processor, perform a method, the method comprising:
        obtaining, by a backup agent, a backup request; and
        in response to the backup request:
            obtaining a complete application listing, wherein the complete application listing specifies a plurality of applications specified in the backup request, wherein each of the plurality of applications is accessed by a cloud-based service;
            comparing the complete application listing to a cloud-based application listing; wherein the cloud-based application listing specifies a portion of the plurality of applications executing in the cloud-based service;
            making a first determination that the complete application listing specifies a second portion of the plurality of applications and that the cloud-based application listing does not specify the second portion of the plurality of applications; and
            in response to the first determination, initiating a hybrid workflow, wherein the hybrid workflow specifies backing up each of the plurality of applications.

9. The system of claim 8, the method further comprising:
    obtaining, by the backup agent, a second backup request; and
    in response to the second backup request:
        obtaining a second complete application listing, wherein the second complete application listing specifies a second plurality of applications associated with the second backup request;
comparing the complete application listing to the cloud-based application listing; wherein the cloud-based application listing specifies the second plurality of applications;
making a second determination that the complete application listing does not specify more than the second plurality of applications; and
in response to the second determination, initiating a backup operation of the second plurality of applications.

10. The system of claim 8, the method further comprising:
obtaining, by the backup agent, a second backup request; and
in response to the second backup request:
obtaining a second complete application listing, wherein the second complete application listing specifies a second plurality of applications associated with the backup request;
comparing the second complete application listing to the cloud-based application listing;
making a second determination that the second complete application listing specifies more than the portion of the plurality of applications; and
in response to the first determination:
sending a workflow request to a client;
obtaining a workflow response, wherein the workflow response specifies performing a backup operation on the portion of applications; and
in response to the workflow response, initiating the backup operation on the portion of the plurality of applications.

11. The system of claim 10, wherein the workflow response further specifies a backup type to be generated for the portion of applications.

12. The system of claim 8, wherein the plurality of applications comprises a portion of cloud-based applications and a portion of third-party applications.

13. The system of claim 8, wherein the complete listing is obtained from a cloud-based service, and wherein the cloud-based listing is obtained using a configuration databased stored in the backup agent.

14. The system of claim 8, wherein the hybrid workflow comprises:
generating a hybrid workflow identifier;
determining a backup type to be implemented on each of the plurality of applications;
generating a backup of each of the plurality of applications; and
storing the backup of each of the plurality of applications in a backup storage.

15. A non-transitory computer readable medium comprising computer readable program code, which when executed by a computer processor enables the computer processor to perform a method for performing a backup operation, the method comprising:
obtaining, by a backup agent, a backup request; and
in response to the backup request:
obtaining a complete application listing, wherein the complete application listing specifies a plurality of applications specified in the backup request, wherein each of the plurality of applications is accessed by a cloud-based service;
comparing the complete application listing to a cloud-based application listing, wherein the cloud-based application listing specifies a portion of the plurality of applications executing in the cloud-based service;
making a first determination that the complete application listing specifies a second portion of the plurality of applications and that the cloud-based application listing does not specify the second portion of the plurality of applications; and
in response to the first determination, initiating a hybrid workflow, wherein the hybrid workflow specifies backing up each of the plurality of applications.

16. The non-transitory computer readable medium of claim 15, the method further comprising:
obtaining, by the backup agent, a second backup request; and
in response to the second backup request:
obtaining a second complete application listing, wherein the second complete application listing specifies a second plurality of applications associated with the second backup request;
comparing the complete application listing to the cloud-based application listing; wherein the cloud-based application listing specifies the second plurality of applications;
making a second determination that the complete application listing does not specify more than the second plurality of applications; and
in response to the second determination, initiating a backup operation of the second plurality of applications.

17. The non-transitory computer readable medium of claim 15, the method further comprising:
obtaining, by the backup agent, a second backup request; and
in response to the second backup request:
obtaining a second complete application listing, wherein the second complete application listing specifies a second plurality of applications associated with the backup request;
comparing the second complete application listing to the cloud-based application listing;
making a second determination that the second complete application listing specifies more than the portion of the plurality of applications; and
in response to the first determination:
sending a workflow request to a client;
obtaining a workflow response, wherein the workflow response specifies performing a backup operation on the portion of applications; and
in response to the workflow response, initiating the backup operation on the portion of the plurality of applications.

18. The non-transitory computer readable medium of claim 17, wherein the workflow response further specifies a backup type to be generated for the portion of applications.

19. The non-transitory computer readable medium of claim 15, wherein the plurality of applications comprises a portion of cloud-based applications and a portion of third-party applications.

20. The non-transitory computer readable medium of claim 15, wherein the complete listing is obtained from a cloud-based service, and wherein the cloud-based listing is obtained using a configuration databased stored in the backup agent.

* * * * *